(12) United States Patent
Funes Mora

(10) Patent No.: US 12,211,139 B2
(45) Date of Patent: Jan. 28, 2025

(54) METHOD FOR CAPTURING AND DISPLAYING A VIDEO STREAM

(71) Applicant: Eyeware Tech SA, Martigny (CH)

(72) Inventor: Kenneth Alberto Funes Mora, Lausanne (CH)

(73) Assignee: Eyeware Tech SA, Martigny (CH)

( * ) Notice: Subject to any disclaimer, the term of this patent is extended or adjusted under 35 U.S.C. 154(b) by 166 days.

(21) Appl. No.: 17/761,460

(22) PCT Filed: Sep. 18, 2020

(86) PCT No.: PCT/IB2020/058718
§ 371 (c)(1),
(2) Date: Mar. 17, 2022

(87) PCT Pub. No.: WO2021/053604
PCT Pub. Date: Mar. 25, 2021

(65) Prior Publication Data
US 2023/0024396 A1 Jan. 26, 2023

(30) Foreign Application Priority Data
Sep. 20, 2019 (EP) .................................. 19198575

(51) Int. Cl.
*G06T 15/20* (2011.01)
*G06F 3/01* (2006.01)
(Continued)

(52) U.S. Cl.
CPC .............. *G06T 15/20* (2013.01); *G06F 3/013* (2013.01); *G06T 5/50* (2013.01); *G06T 5/70* (2024.01);
(Continued)

(58) Field of Classification Search
CPC .. G06T 15/20; G06T 5/50; G06T 5/70; G06T 7/50; G06T 7/70; G06T 17/20;
(Continued)

(56) References Cited

U.S. PATENT DOCUMENTS 7,460,150 B1 12/2008 Coughlan et al.
11,169,358 B1 * 11/2021 Rong .................. G02B 27/283
(Continued)

FOREIGN PATENT DOCUMENTS

EP 3489900 A1 5/2019

OTHER PUBLICATIONS

Bichlmeier, Christoph, et al. "Contextual anatomic mimesis hybrid in-situ visualization method for improving multi-sensory depth perception in medical augmented reality." 2007 6th IEEE and ACM international symposium on mixed and augmented reality. IEEE, 2007. (Year: 2007).*

(Continued)

*Primary Examiner* — Daniel F Hajnik
(74) *Attorney, Agent, or Firm* — BLANK ROME LLP

(57) ABSTRACT

The present invention relates to a method for capturing and displaying a video stream, comprising: capturing with one or a plurality of cameras a plurality of video streams of a scene, said scene comprising at least one person; reconstructing from said plurality of video streams a virtual environment representing the scene, determining the gaze direction of said person using at least one of said plurality of video streams; projecting said virtual environment onto a plane normal to said gaze direction for generating a virtual representation corresponding to what that person is looking at and from the point of view of that person; displaying said virtual representation on a display.

11 Claims, 6 Drawing Sheets

(51) Int. Cl.
  *G06T 5/50* (2006.01)
  *G06T 5/70* (2024.01)
  *G06T 7/50* (2017.01)
  *G06T 7/70* (2017.01)
  *G06T 17/20* (2006.01)

(52) U.S. Cl.
  CPC .................. *G06T 7/50* (2017.01); *G06T 7/70* (2017.01); *G06T 17/20* (2013.01); *G06T 2207/10016* (2013.01); *G06T 2207/10024* (2013.01); *G06T 2207/10028* (2013.01); *G06T 2207/30201* (2013.01); *G06T 2210/56* (2013.01)

(58) Field of Classification Search
  CPC . G06T 2207/10016; G06T 2207/10024; G06T 2207/10028; G06T 2207/30201; G06T 2210/56; G06F 3/013; H04N 7/181; H04N 23/90; H04N 5/272
  See application file for complete search history.

(56) References Cited

U.S. PATENT DOCUMENTS

| | | | |
|---|---|---|---|
| 2014/0293016 A1* | 10/2014 | Benhimane | G06T 7/246 |
| | | | 348/50 |
| 2015/0036931 A1 | 2/2015 | Loui et al. | |
| 2015/0288979 A1* | 10/2015 | Dong | H04N 19/159 |
| | | | 375/240.12 |
| 2015/0317410 A1* | 11/2015 | Blodgett | G06T 19/20 |
| | | | 703/1 |
| 2018/0082482 A1* | 3/2018 | Motta | G02B 27/0093 |
| 2019/0279407 A1* | 9/2019 | McHugh | G06F 3/011 |
| 2019/0295507 A1* | 9/2019 | Abuelsaad | A61B 3/111 |
| 2020/0294311 A1* | 9/2020 | Holz | H04N 13/271 |
| 2021/0192793 A1* | 6/2021 | Engelland-Gay | G06T 3/40 |

OTHER PUBLICATIONS

International Search Report & Written Opinion for PCT/IB2020/058718 dated Feb. 11, 2021, 17 pgs.

* cited by examiner

METHOD FOR CAPTURING AND DISPLAYING A VIDEO STREAM

RELATED APPLICATIONS

This application is a national phase of PCT/IB2020/058718, filed on Sep. 18, 2020, which claims priority to European Application No. EP19198575.3, filed Sep. 20, 2019. The entire contents of these applications are hereby incorporated by reference.

FIELD OF THE INVENTION

The present invention concerns a method for capturing and displaying a video stream.

DESCRIPTION OF RELATED ART

First view viewer (FPV) software games are known in which a player can move in a virtual environment that is displayed from the point of view of a virtual person progressing into that environment. The displacements in the environment are controlled by displacements commands entered the player, usually with a keyboard, a mouse or a joystick for example.

On the other hand, virtual reality headsets that display a 360° view of a scene through which an immersed user can move by entering displacements commands with movements of his head or body. The scene could correspond to a virtual environment created by computer designers, and/or to a real environment captured for example with a 360° camera.

U.S. Pat. No. 7,460,150B1 discloses a method using gaze detection to obtain imagery from a scene where significant events are occurring. In order to determine the gaze of persons within a scene, images of the faces of those persons are obtained, and the gaze or line of sight of those persons is determined. Image information encompassing an area of the scene at which the gazes of a majority of the persons are directed is then obtained and displayed. This method may be used in videoconferencing applications to determine the area of interest of a scene, but the image that is displayed usually does not correspond to the view of any of the participants.

BRIEF SUMMARY OF THE INVENTION

It is an aim of the present invention to propose a new method for capturing and displaying a video stream.

According to the invention, this aims is achieved by means of a method for capturing and displaying a video stream, comprising:
- capturing with one or a plurality of cameras a plurality of video streams of a scene, said scene comprising at least one person;
- reconstructing from said plurality of video streams a virtual environment representing the scene,
- determining the gaze direction of said person using at least one of said plurality of video streams;
- projecting said virtual environment onto a plane normal to said gaze direction or onto a plane defined with respect to the head direction of said person for generating a virtual representation corresponding to what that person is looking at and from the point of view of that person;
- displaying said virtual representation on one or more displays.

The video stream that is rendered and displayed thus depends on the viewpoint of one single person in the scene.

The video stream that is rendered and displayed correspond to a virtual camera at a position that follows the position of the person in the scene, and that points in the direction the person is gazing at.

The video stream preferably does not depend on displacements commands of the viewer of the video stream.

In one embodiment, the person in the scene whose viewpoint determine the viewpoint of the virtual camera moves independently from at least one of said cameras.

In one embodiment, at least one of said camera being static, said person being moving relative to that camera.

In one embodiment, all said camera being static, said person being moving relative to all said cameras.

In one embodiment, at least one said camera is dynamic and moves together with the person.

In one embodiment, at least one said camera is dynamic and moves together with the person, and at least one said camera is static.

In one embodiment, the system comprises a plurality of dynamic cameras, but none move in relation to the person.

In one embodiment, the determination of the gaze information uses at least one of said video streams.

In one embodiment, the determination of the gaze information includes a step of determining a head pose.

In one embodiment, the method comprises reconstructing a virtual environment from said video streams.

In one embodiment, the method comprises a step of extracting the background portion from at least one of said video streams. The virtual environment is determined using said background portion.

In one embodiment, this step of extracting a background portion comprises overlapping or otherwise combining at least two frames, preferably at least five frames, of data from one camera, in order to minimise the number of holes generated by faulty data in one frame.

Holes may be caused by pixel defects, occlusions, sensor noise, dust etc.

In one embodiment, the method comprises a step of extracting the static portion from at least one of said video streams, the determination of said virtual environment using said static portion.

The extraction of the background and/or static portion of the image is preferably performed in advance, for example before the person enters and moves into the scene. Therefore, postprocessing the portion of images that correspond to this background and/or static portion does not require to be performed in real time. Processing algorithms that require an important computational power can thus be applied to those portions, even if the available processing resources are relatively weak.

In one embodiment, the method comprises a step of extracting background portions from the plurality of video streams, determining said virtual environment from said background portions, post-processing said background portions and/or said virtual environment, and superimposing a virtual foreground corresponding to the foreground that said person is looking at over said virtual environment.

In one embodiment, said cameras comprise RGB-D cameras delivering RGB video streams with depth information.

In one embodiment, the depth of each pixel is determined indirectly by combining video streams of the same scene captured from different viewpoints, for example with a stereo camera.

In one embodiment, said step of determining a virtual environment comprises retrieving at least one point cloud from at least one video stream, and generating meshes from said point cloud.

In one embodiment, said method comprises a step of generating from the RGB-D video stream delivered by each camera a mesh in a coordinate system of said camera, aligning a plurality of coordinate systems, and combining said meshes.

In one embodiment, at least one of said cameras is a front camera of a smartphone of said person, and at least one other camera is a back camera of said smartphone.

In one embodiment, the method comprises determining at what distance the person is looking at and applying blur to objects away from that distance.

In one embodiment, the method comprises determining the direction the person is looking at and applying blur to portion of the image away from that direction.

In one embodiment, the scene comprises one or more screens displaying arbitrary content, such as a video game. The arbitrary content is captured and forwarded as additional video streams to be used in the step of reconstructing from the plurality of video streams a virtual environment representing the scene as a function of also the 3D pose and physical model of the one or more screens.

In one embodiment, said one camera is embedded into a mobile device for capturing the plurality of video streams of the scene.

According tone aspect, the invention is also related to a tangible computer product containing program code for causing a processor to execute the above described method.

BRIEF DESCRIPTION OF THE DRAWINGS

The invention will be better understood with the aid of the description of an embodiment given by way of example and illustrated by the figures, in which:

FIG. 4 is a flowchart that illustrates the steps of reconstructing a virtual environment and displaying one video stream corresponding to the viewpoint from one person in a scene, according to another embodiment of the present invention;

FIG. 6A illustrates the extended field of view of human eyes in a horizontal plane;

DETAILED DESCRIPTION OF POSSIBLE EMBODIMENTS OF THE INVENTION

Figure 1:
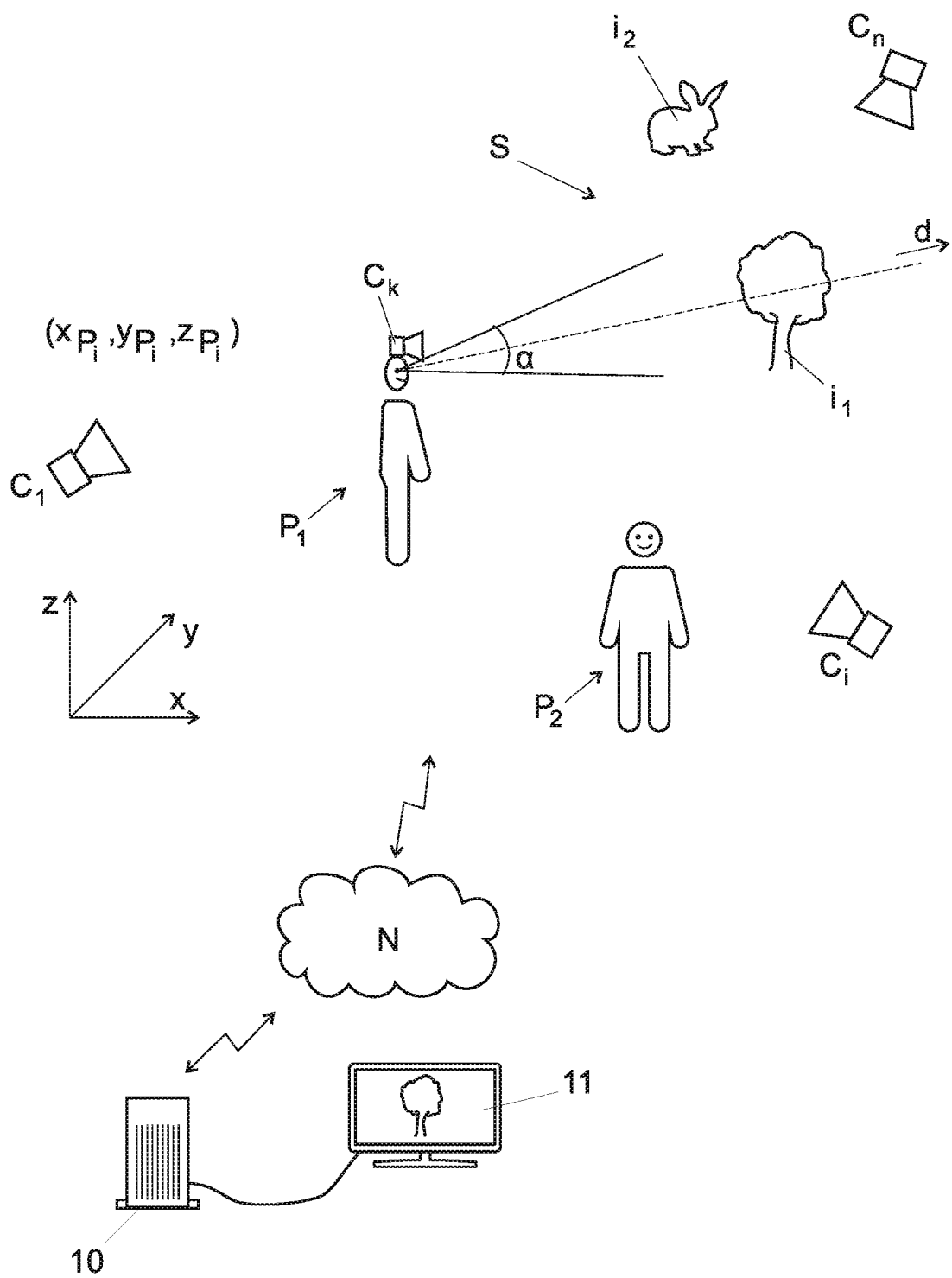
FIG. 1 shows a system according to the invention.

FIG. 1 schematically shows an example of system comprising a plurality of cameras $C_1, C_i, \ldots C_n$ for capturing a scene S. The cameras are preferably all static, although the system may include one or a plurality of moving cameras, for example a camera $C_k$ worn by a person $P_1$ in that scene, and/or other cameras that move relative to the scene and to the person.

The scene S may include a plurality of items, including the persons $P_1, P_2, \ldots$, and other fixed or moving items $i_1$, $i_2$, etc.

The person P1 in the scene is at location $X_{p1}, Y_{p1}, Z_{p1}$ in a coordinate system static relative to the scene. This position can change over time when the person moves in the scene. Furthermore, the person $P_1$ looks at direction d with a field of view defined by an angle $\alpha$ around that direction. The viewpoint of the person P1 includes some of the items in the scene, such as the item $i_1$, and excludes other items, such as items $i_2$ or $P_2$.

Each camera $C_i$ captures the scene S or a portion of that scene from a different viewpoint, and generates a corresponding video stream. In a preferred embodiment, at least one of the cameras, and preferably all cameras $C_i$, are RGB-D cameras and include an RGB sensor as well as a depth sensor. In an embodiment, some of the cameras are infrared cameras, or near infrared cameras. In an embodiment, at least some of the cameras are greyscale cameras. In one embodiment, the system does not comprise any depth cameras. Cameras of one or different types could be mixed. The resolution, type and focal of different cameras may vary.

The video stream of data from each RGB-D camera thus comprises a series of RGB frames that indicates for each pixel the correspondent color and depth frames that indicates for each pixel the measured distance between the camera to the environment. Knowing the camera intrinsic parameters: width and height (the number of rows and columns in the image, respectively), the focal length of the image, the center of and the distortion model, it is possible to deproject the 2D pixel location using the correspondent depth value on the stream of images, to a 3D coordinate in the coordinate system of the camera.

In one embodiment, we consider that the camera lens does not impose a distortion. The 3D deprojection then simplifies to first, computation of the angle between the pixel (x, y) on the image plane and the center of projection and use the depth value and the trigonometric relation to obtain the X and Y position in relation to the camera coordinate system. By performing this operation to all pixels, a 3D point cloud is generated.

In another embodiment, the distortion of the lens is compensated by applying an inverse transfer function of the lens to each pixel.

The system further comprises a computer 10 with a display 11 that is connected to each camera Ci over a network, such as the Internet, a LAN, a Wi-Fi, or any suitable network.

At least some of the cameras could also be connected together and/or with the computer 10 over a USB cable, a proprietary protocol, or be part of a same device, such as for example a smartphone with multiple cameras.

The computer 10 reconstructs a virtual environment corresponding to the scene S from the video streams received from each camera, determines the viewpoint of a person $P_1$ in that scene, and displays on the display 11 a virtual video that represents the view of that person. In another embodiment, some of the steps are performed by a first computing system, such as a server or cloud server in the Internet, and other steps are performed by another computing system, such as a user computer or smartphone for example. The reference $U_1$ designates a user who views the displayed virtual representation on the display 11.

Figure 2:
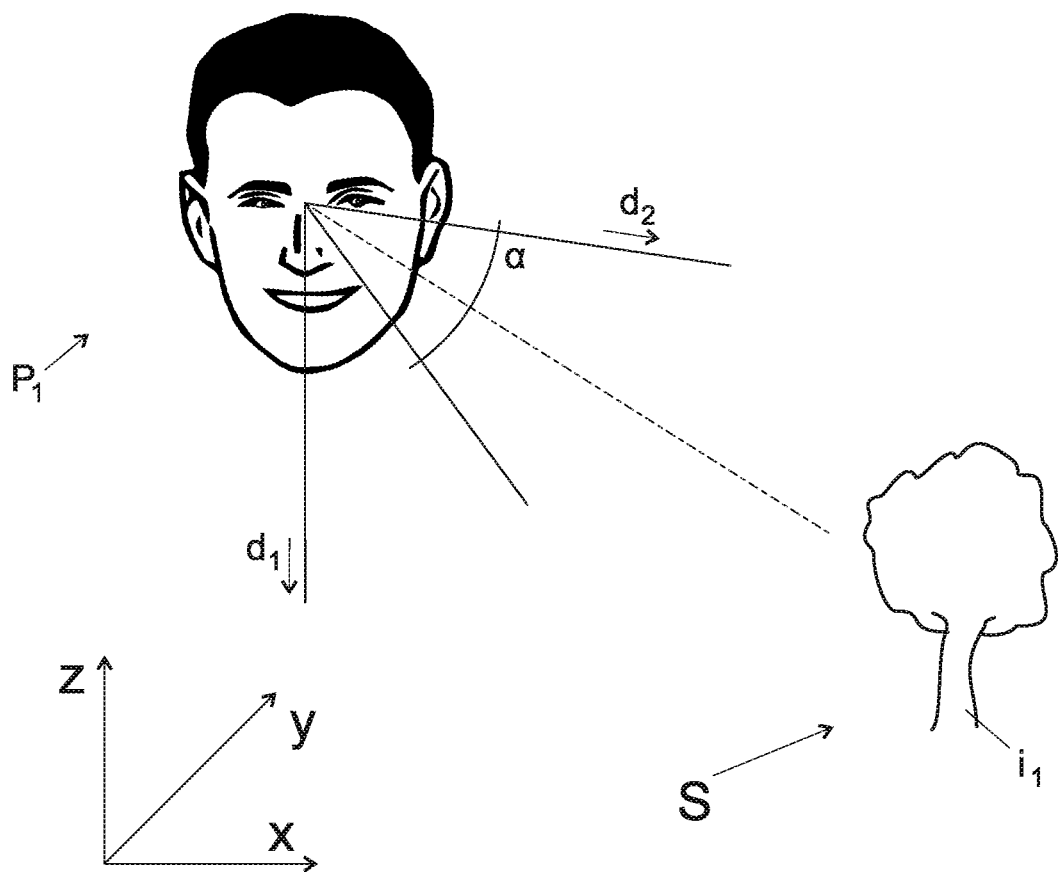
FIG. 2 shows a person whose viewpoint determines the image that is displayed.

FIG. 2 schematically illustrates a person $P_1$ gazing at a direction defined by the head pose $d_1$ (for example a vector normal to face of the person) and by his gazing direction $d_2$ that depends on the position of the pupils. The resulting gazing direction may be determined in the coordinate system of each camera and in a common coordinate system x,y,z (world coordinate system).

The method combines a set of different steps in order to transform the data coming from the plurality of cameras $C_i$ into a 3D scene, compute the person's P1 head pose and gaze estimation and synthesize what that person is looking.

In one embodiment, the method comprises following steps:

Point Cloud and Mesh generation from RGB-D data;
Projection of the physical setup on the virtual environment;
Background capturing and hole filling;
Mesh alignment;
Eye's tracking;
Camera rendering A possible embodiment of a method according to the invention is illustrated with FIGS. 3 and 4. In that embodiment, the method comprises a step of background and foreground extraction in order to generate a virtual environment of the background in advance and superimpose foreground or dynamic items onto that environment.

When using depth cameras to capture both a background or static portion and a foreground or dynamic portion, such as a moving person, the video stream may include "depth shadows" resulting from occlusions of the background by the moving foreground. Those occlusions create artifacts on the 3D scene, decreasing the visual quality of the scene.

In order to solve this issue, the capturing process may be split in static and dynamic capturing and/or in background/foreground parts. In the first step, the background is brought to the 3D world. At this step, it is possible to apply algorithms to improve the most the gathered data. At the second step, the dynamic scene is superimposed on the static scene, with that, the "depth shadow" problem is solved.

This separate processing of background and/or static portions of the images usually results in a better quality of the rendered and displayed video stream. However, the method may also be performed without any foreground/background or static/dynamic extraction.

Figure 3:
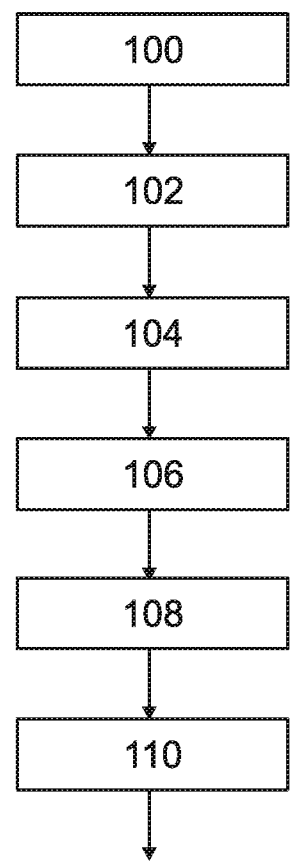
FIG. 3 is a flowchart that illustrates the steps of reconstructing a virtual environment from the background portions of video streams captured with a plurality of camera, according to an embodiment of the present invention.

FIG. 3 illustrates steps of the method that may be performed in advance, for example before the interval of time to be displayed, or before the person $P_1$ enters the scene. In an embodiment, at least some of those steps may be performed in real time, for example during the display.

During step 100, a plurality of cameras $C_i$ captures a video stream of the scene S, each from its point of view.

Preferably, at least one of the cameras is an RGB-D camera; however, not all the cameras need to be RGB-D cameras and some cameras may be used for capturing only an RGB stream, and other may be used for capturing only a depth stream. In one embodiment, the system comprises one or a plurality of RGB cameras and one or a plurality of depth cameras; the streams from those cameras are then combined.

The system may also use other video streams. For example one or more displays in the scene S, for example one or more computer screens that may display any arbitrary content such as a video game. The screen arbitrary content can be captured by respective computer and the screen-captured video may then be forwarded as additional video streams to a rendering engine. The rendering engine is configured to take the screen-captured video and to insert it as a texture into the 3D point cloud representing the 3d scene. Insertion of the screen-captured video into the 3D point cloud may be done through for example a UV mapping, whereby 3D scene vertices get associated with the screen-captured video stream and this association is used by the rendering engine to render the texture on the right orientation and position. The 3D pose of each computer screen in regards to the scene S and its mechanical parameters must therefore be known to insert the texture in the right place from an arbitrary point of view which is dynamic as it is generated based on eye or head tracking data as described in detail subsequently. As a result, the rendering of the virtual environment looks as if it would have been captured by the plurality of cameras $C_1, C_i, \ldots C_n$ but with a higher quality as the computer screen(s) has a higher resolution than the cameras.

A computer screen or display can be modelled as a plane of specific dimensions width and height, a screen coordinate system (x-y-z axis) which can be defined in an arbitrary location within the screen object (such as in its top-left corner), and finally the 3D pose which indicates how the screen coordinate system referential is positioned with respect to the overall scene referential. The 3D pose can be modelled as a rigid transform composed of a 3×3 rotation matrix and a 3×1 translation vector. Alternative representations for 3D pose are possible, such as using quaternions or Euler angles. Such parameters can therefore fully describe where, in the 3D scene, the screen-captured video data should be displayed and how much space it should occupy, thus generating a reliable representation of the screen content when integrated into the 3D rendering engine. Additionally, the screen model may be augmented with parameters describing screen curvature for newer curved displays.

During step 102, the background portion and/or the static portion is extracted from the video stream from each camera.

Two methods of background/foreground extractions may be applied at this stage.

Depth Distance Filtering

This method assumes that the dynamic/foreground portion of the scene is closer to the camera than the static/background portion, so that a depth filter can be applied to extract the background or the foreground. For that, the average depth of the frame is computed and everything that is further than that is deleted from the scene. This filter is computationally fast, but the result may be too aggressive, too much of the dynamic scene being filtered from the result.

Static Background Filtering

This filter analyses what is dynamic or not on the captured frame. This can be done by comparing the current frame to the previous one and only display the parts of the frame that are different (both in terms of depth and RGB data).

During step 104, a post processing is performed on the extracted background/static portion of each video stream from the different cameras. Since the background and/or static portion of the environment does not need to be captured in real-time, more computation time is permitted per frame, which allows for the application of more computationally intensive algorithms/filters to improve the visual quality of the acquired background and/or static portion of the environment.

Following post-processing steps may be applied to the background and/or static portion of the depth frames: Edge-preserving filtering, Spatial Hole-filling, Temporal filtering.

Other post-processing steps may be applied to the RGB frames and include for example brightness correction, contrast corrections, white balance correction, sharpness improvements, lens correction, etc.

Edge-Preserving Smoothing Filtering,

This filter smooths the depth noise while attempting to preserve edges. The depth values obtained by the 3D cameras have noise associated with them. By applying a regular smoothing filtering (low-pass spatial filter) to decrease the effects of the noise on plain surfaces, it is possible to minimize the error between the measured depth value and the real one and improve the quality of the depth map. However, in the case of sudden changes on the depth (edges of person/objects and walls), the smoothing filtering will increase the error around those 3D places. In order to reduce this problem, it is suggested to use a smoothing filter that preserves the edge. In one example, a threshold value between adjacent depth values is defined so that, when the value surpassed, the smoothing filtering will not be applied. It is thus possible to maintain the clear discrete split between different surfaces.

Spatial Hole-Filling

Sensors in camera, such as depth sensors, are not able to get a valid value for every pixel in every captured frame. This results in holes or noise in the 3D scene, which decrease the quality of the 3D virtual representation. One simple assumption that can be made is that in the existence of a hole or noisy pixel in the depth frame, the missing or invalid value should have a value similar to the depth values around that point. In the implementation of this filter, two passes are done over the data. First, the matrix of depth pixels is analyzed from left to right and then, on the second pass, it is analyzed from right to left. When a missing value is found, the value on the left (first pass) or on the right (second pass) is copied to the missing point and the small holes are filled.

Temporal Filtering and Superposition of Frames.

Considering that the noise has an average value of 0, it is possible to reduce it by taking multiple measurements of the same point. So, whenever possible, it is recommended to use some amount of time averaging to improve the depth, however, it is necessary that holes on the depth frame are not used on the averaging. For this, an exponential moving average (EMA) filter is used, that combines the depth values from the last frames in order to reduce the noise that exist on the captured data.

A plurality of frames, preferably at least 5 frames, are preferably combined during this step.

Mesh Generation from Point Cloud (Step 106)

The postprocessing of each background video stream delivered by cameras result in a point cloud, i.e. a 2D matrix of pixels each associated with one depth value.

To generate a mesh representation of the background from this point cloud, planes or other surfaces need to be created during step 106 in order to determine vertices between points and fill the holes between the vertices. In one example, polygons, such as triangles, are used to connect to points. The surfaces of this mesh are then painted by applying textures or images from the RGB-stream.

Mesh Alignment (Step 108)

The method uses multiple cameras $C_i$ in order to extend the area of the background/static portion of the scene that is scanned onto the virtual 3D environment. However, the generated point clouds and meshes have their points coordinates in relation to the coordinate system of each camera, meaning that it is necessary to convert those coordinates into a common coordinate system, called world coordinate system, for example a coordinate system that is fixed relative to the scene.

This conversion may use predefined extrinsic camera parameters, for example an a-priori known position and orientation of each camera in a common coordinate system. Alternatively, the conversion is based on an identification and localization of common features in video streams from different cameras.

Even with proper alignment of the cameras on the physical world, small discrepancies may occur between what is the geometry stated for the application and what is the physical geometry of the cameras on the scene. These small discrepancies induce alignment errors on the virtual scene that create exaggerated visual artifacts. Alignment algorithms may be used that try to find the correct relative pose between the cameras.

Iterative closest point algorithms may be used for correcting those remaining discrepancies. These are employed to minimize the difference between different sets of 3D points, thus improving the 3D reconstruction using multiple overlapping points of view. The algorithms use both geometry and color to find the correct relative pose of the meshes. First, by using the 3D location of common points on the overlapping area, it finds a rough estimation of the pose. When the scene has a lot of variations on the depth, this rough estimation of the pose already achieves a good alignment of the different meshes. However, when there isn't a lot of variations of the depth frame, slipping of planar surfaces can occur, meaning that even though there's an alignment on the depth frame, when the RGB values are added to the scene, it is possible to see that the alignment is not 100% correct. So, the second phase of this algorithm is to use the estimation obtained in the first phase as an initial relative pose and then, use the RGB value of the 3D points to get the final alignment of the meshes.

Combining Meshes (Step 110)

After conversion into a common coordinate system and alignment, the meshes from the different cameras are then combined in order to reconstruct a virtual environment corresponding to the scene S (step 110).

Processing the Foreground

The previously described steps result in a virtual representation of the background or static portion of the scene S, for example as a set of polygons.

Figure 4:
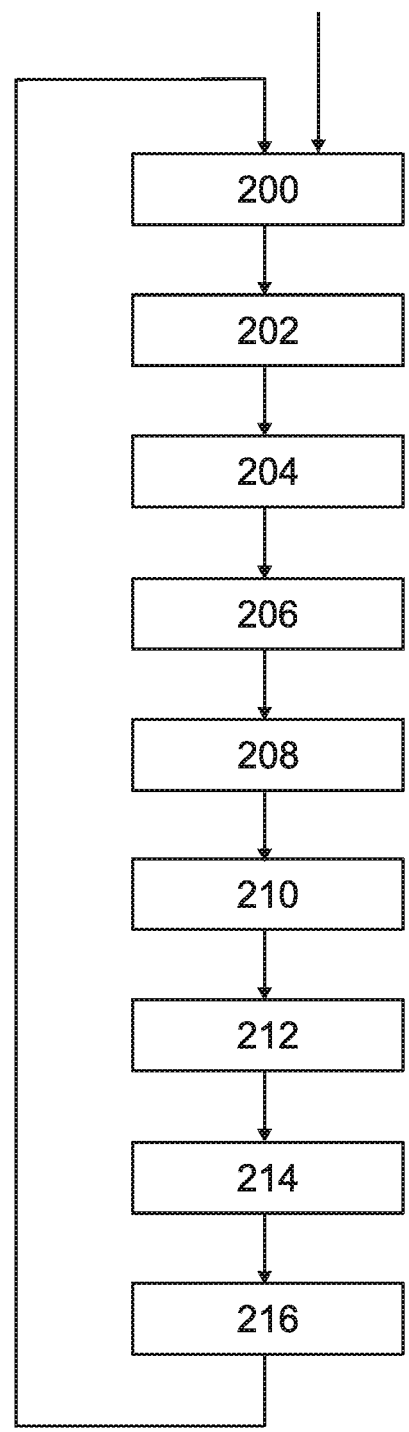
FIG. 4 is a flowchart that illustrates the steps of reconstructing a virtual environment combining the background and foreground portions of video streams captured with a plurality of camera, and the displaying of one video stream corresponding to the viewpoint from one person in the scene, according to an embodiment of the present invention.

We will now describe in relations with FIG. 4 steps 200 to 216 for superimposing a foreground/dynamic portion onto that background/static environment and displaying the whole environment from the viewpoint of a person $P_1$ in the scene.

Those steps may be performed in real-time, i.e., while the person $P_1$ is moving within the scene. Alternatively, those steps may be performed after the steps 100-110 and after the period of presence of the person Pi in the scene. In yet another embodiment, those steps may be performed simultaneously with steps 100-110.

During step 200, each camera Ci, or a different set of cameras, capture an RGB-D video stream from the scene S with a foreground and/or dynamic portion, for example moving persons $P_i$ or items $I_i$.

During step 202, the foreground and/or dynamic portions of each video streams portion are extracted. Identical or similar algorithms may be used that during above described step 102.

During step 204, the foreground and/or dynamic portions extracted from each video stream are post-processed. Both the RGB video stream and the depth stream may be improved. The post-processing may use the same algorithms or methods than the postprocessing previously applied to the background/static portions; alternatively, for example if the foreground/dynamic portions need to be processed in real time, more simple and faster post-processing steps may be applied.

During step 206, a mesh is generated from each point clouds delivered by the postprocessing of the foregrounds/dynamic portions extracted from the different video streams. The same algorithms may be applied than the one previously used for the mesh generation of the background. In an embodiment, the quality of the meshes for the foreground is better than the quality of the meshes for the background/static portions; for example, the density of polygons might be higher, and/or the resolution of the textures might be improved, resulting in a better representation of the foreground.

During step 208, the different meshes of the foreground/static portions that are generated from the video streams from the different cameras are converted into a common coordinate reference system, preferably the coordinate reference system previously used for the background/static portions and aligned together and with the previously generated mesh representation of the background/static portion.

During step 210, the aligned meshes of the foreground/static portions are combined together and with the previously generated mesh of the background portion.

Eye's Tracking (step 212)

Eye and head tracking technologies allows for the estimation of the head and gaze position on the 3D world. In one embodiment, the method estimates the head pose and the direction of the gaze of one person $P_1$ by using RGB-D cameras. First, a depth model of the person $P_1$ is created, and his head pose is estimated. Having that, it is possible to better localize the eyes using the head coordinate system and using both the depth and color frames obtained from the cameras, feed that data to machine learning algorithms that estimate the gaze origin and direction d in relation to the head coordinate system. Having an estimation of the gaze in relation to the head coordinate system and the head position in relation to the camera, it is possible to determine the gaze direction d of that person $P_1$ in the previously defined mesh representation of the scene. This can be repeated periodically, for example for each frame of the video streams.

A head direction can be defined as a 3D ray which points from a pre-defined location in the head coordinate system (such as the tip of the nose, middle-of-the-eyes, or the center of the forehead) towards an invariant direction (for example, pointing always front from the face plane). Such direction becomes dynamic and variant when referred to the Scene, as then it is a function of the changing head pose estimate, captured by the head pose estimator.

The gaze direction could also be determined with other type of cameras, including greyscale, IR, NIR cameras for example.

In another embodiment, the gaze direction is estimated using feature-based method for extracting the pupil, iris, corneal reflections, and determining the gaze from those features.

The advantage of head or eye tracking with external cameras, also referred as remote head or eye tracking, is that the estimation is done in a not intrusive way, not being necessary for the person $P_1$ to modify its behavior or wear any kind of hardware in order to get the data.

The rendered video stream can indeed be generated according to the direction of the eyes or the direction of the head. The advantage of rendering based on the direction of the eyes is that the generated video stream would be highly dynamic, and may more strongly convey better to the viewer the focus and intention of the person whose point-of-view is being rendered. The disadvantage is that some viewers may find such video too dynamic and may cause motion sickness or similar. The advantage of rendering based on the direction of the head is that there would be less motion on the generated video stream, which can be more pleasant to a viewer. Such video can also be augmented with a marker indicating the point of regard (where the person is looking at) within the face-outwards facing scene.

In another embodiment, eye tracking may however be achieved by using the camera of a mobile device, such as a smartphone, without having to require external cameras. A 3D point cloud from a scene comprising one or more displays, such as computer screens, may be generated from a series of frames of the video stream of the scene captured by the camera of the mobile device. A "screen texture" can then be rendered in real-time in the 3D point cloud of the scene at a desired location, as previously described, as a function of the position of the one or more computer screens and the screen arbitrary content captured by the camera of the mobile device to enhance the quality of the 3D reconstruction as seen from the user's eyes. This embodiment therefore only requires one mobile device with a camera and knowledge of the screen(s) 3D pose with respect to the mobile device.

Reconstruction of Virtual View (Step 214)

Now that the mesh representation of the scene as seen by the cameras has been determined for each frame, and knowing the position x,y,z and the gaze direction d of one person P1 in that scene, it is possible to determine the view of that person from his viewpoint, by projecting the scene onto a plane perpendicular to that gaze direction.

Camera Rendering (step 216)

That virtual view can be rendered and displayed on a display 11.

The rendering can be set in different configurations.

The first is a 3rd person view of the world, with the camera having a 60° field of view (fov). In this configuration, the rendered view is that of a virtual camera corresponding to a real camera at the location of the person and gazing at the same direction d.

Figure 6A:
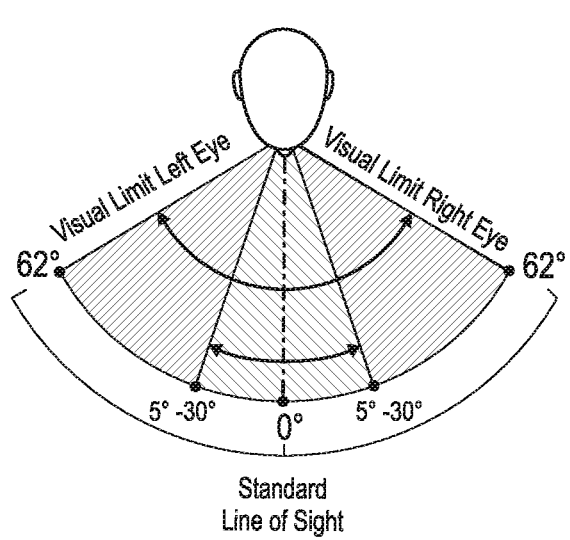
FIG. 6A illustrates the extended field of view of human eyes in a vertical plane.
Figure 6B:
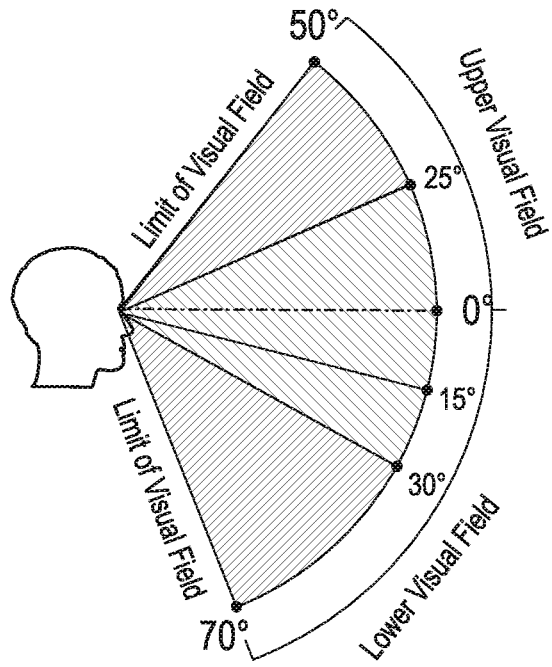

In another rendering mode, the display simulates how a person's eyes at x,y,z and gazing at direction d see the view. FIG. 6A illustrates the field of view of a human in a horizontal plane and FIG. 6B illustrates the field of view of a human in a vertical plane. We can see that although the field of view is larger than 60° both in the horizontal and vertical direction, only a relatively narrow portion of that field of view is focused and allows a recognition of symbols.

Figure 7:
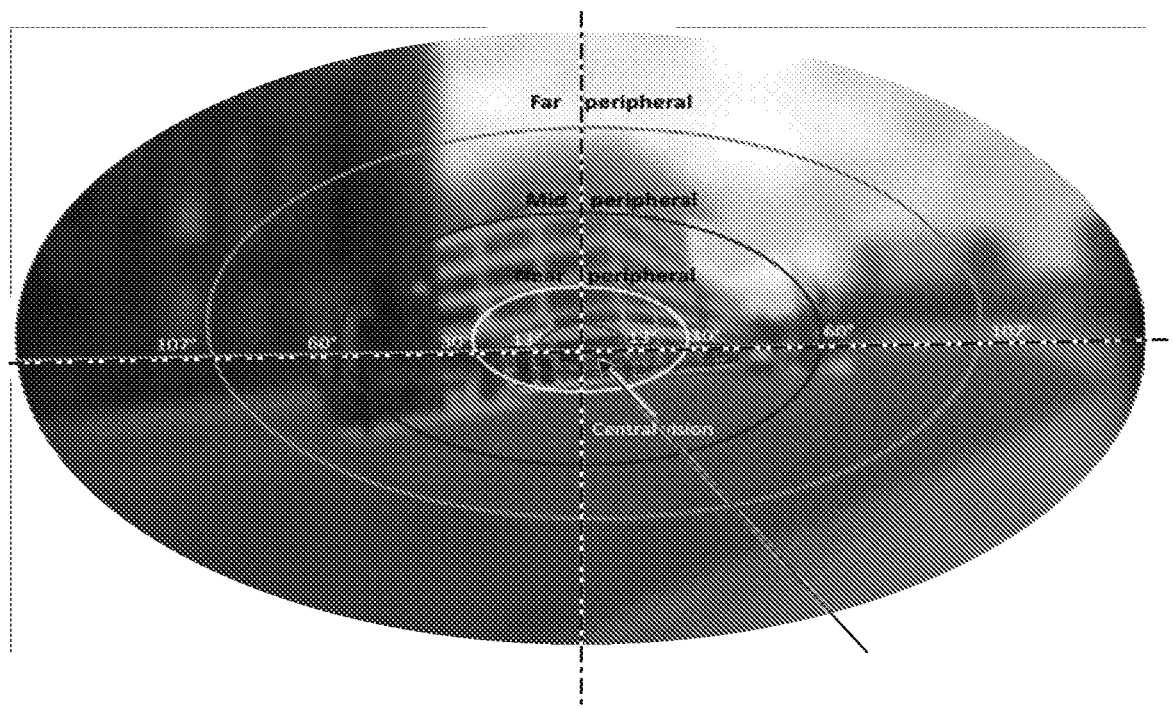
FIG. 7 illustrates an example of foveated rendered and displayed view.

The rendered and displayed image, illustrated as example on FIG. 7, simulates this view. It is enlarged to about 100° to 180° both in the horizontal and in the vertical direction, and two types of blurring are imposed on the display. The first is depth of field effect. Having the gaze origin and direction, it is possible to compute where the person is looking and at what distance from the person is the point of interest. Having that information, it is possible to apply blur of the camera view Z axis, linearly dependent of the distance. This means that objects closer and furthest away from the distance of the point of interest appear blurred.

The second effect is foveated rendering. The human eye does not see the entire field of view with the same definition (both in terms of resolution as color). The point of interest of the eye is at highest definition possible and with a better perception of the color, however, analyzing the rest of the field of view, the definition decreases and at the same point, the color information starts to be just monochromatic. To simulate that, a linear blur is applied from the center of the screen outwards, that mimics the human vision. These two effects combine allows for the user of the application to have a perception of where the person, that is being captured, is looking in a natural way and without the necessity of any other visual clues. In this configuration mode, the position and direction of the camera are set be the average position between the eyes and the average direction between the left and right gaze rays.

Figure 5:
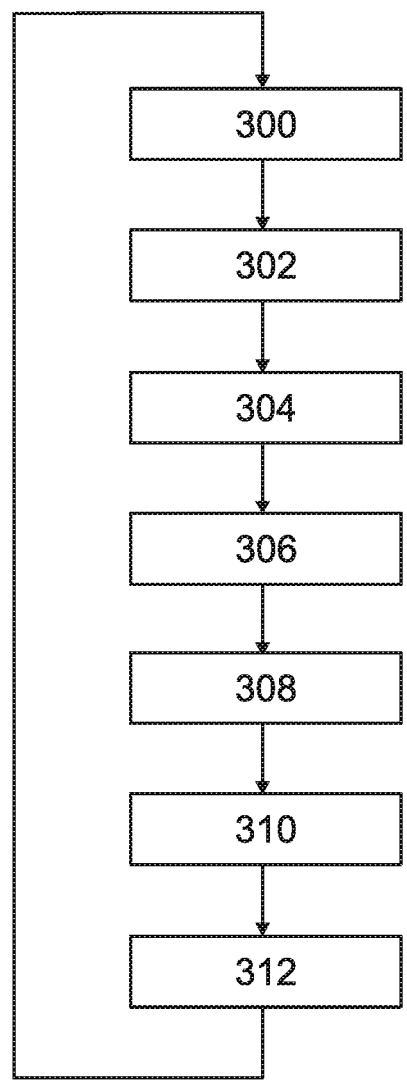

FIG. 5 illustrates another embodiment of a method according to the invention, without any background/foreground extraction. Similar steps may be performed as previously described in relation with the embodiments of FIGS. 3 and 4 and will not be repeated.

During step 300, an RGB-D image is captured with the plurality of cameras, resulting in a corresponding plurality of video streams.

During step 302, each video stream is post-processed; some or all of the above described post-processing steps may be applied.

During step 304, the point clouds corresponding to each frame in each video stream in converted into a mesh representation, for example a polygon representation of the scene as viewed from each camera, with textures.

During step 306, the different meshes are aligned in a common coordinate system.

During step 308, the gaze direction d of one person $P_1$ in the scene is determined, based on the images of that person.

During step 310, a virtual environment corresponding to the scene is reconstructed, and projected onto a plane normal to the gaze direction of the person $P_1$.

During step 312, that projection is displayed on a display 11.

Other embodiments could be considered. For example, in an embodiment, no point cloud is generated and used; instead, an artificial intelligence (AI) system, such as a neural network, is used that was trained to synthesize a virtual environment, such as a 3D mesh representation, from video streams captured with different cameras from different viewpoints.

In yet another embodiment, an AI system (such as a neural network) is used to further improve the displayed video after combining the different point clouds.

Possible Uses

In one embodiment, the scene corresponds to a location where sport is performed, for example a stadium, a sport hall, etc. At least some of the cameras are static and capture a sport event, for example a team sport match. The person $P_1$ is a player and the rendered and displayed view is a virtual representation of what that player sees during the game. This view can be stored and/or broadcasted to users, for example spectators.

In another embodiment, at least some of the cameras are front and back cameras of an equipment, such as a smartphone. The front camera is used for determining the gaze direction d of the user (person $P_1$) of the smartphone and the other cameras on the back face of the smartphone are used for capturing the whole scene in front of the person. The method can then be used for rendering and displaying what that person is gazing at each instant.

In an embodiment, two videos are displayed, one for each eye. This would allow to view the scene from the person P1 perspective using binocular displays like head mounted displays, so the user (third person observer) would have the perception of 3D.

In an embodiment, the method is used in a job collaborative setting. For example, a video stream could be generated to present the viewpoint of one person $P_1$ who explains something.

Additional Features and Terminology

The proposed devices 10, 11 can rely for example on equipment such as smartphones, tablets, personal computers, servers, or the like.

Depending on the embodiment, certain acts, events, or functions of any of the algorithms described herein can be performed in a different sequence, can be added, merged, or left out altogether (for example, not all described acts or events are necessary for the practice of the methods). Moreover, in certain embodiments, acts or events can be performed concurrently, for instance, through multi-threaded processing, interrupt processing, or multiple processors or processor cores or on other parallel architectures, rather than sequentially. In addition, different tasks or processes can be performed by different machines or computing systems that can function together.

The various illustrative logical blocks, modules, and algorithm steps described herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, a microprocessor, a graphic processor unit (GPU), an AI accelerator unit, a state machine, a digital signal processor (DSP), an application specific integrated circuit (ASIC), a FPGA, or other programmable logic device, discrete gate or transistor logic, discrete hardware components, or any combination thereof designed to perform the functions described herein. A hardware processor can include electrical circuitry or digital logic circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a device controller, or a computational engine within an appliance, to name a few.

"Servers" or "devices" can be implemented or performed by a physical machine, a virtual server, a general-purpose computer, multiple servers, cloud based computational resources, or other programmable components or modules providing the services and methods described.

The steps of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements or states. Thus, such conditional language is not generally intended to imply that features, elements or states are in any way required for one or more embodiments or that one or more embodiments necessarily include logic for deciding, with or without author input or prompting, whether these features, elements or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

The invention claimed is:

1. A method for capturing and displaying a video stream, comprising:
   capturing with one or a plurality of cameras a plurality of video streams of a scene, said scene comprising at least one person;
   reconstructing from said plurality of video streams a virtual environment representing the scene, determining the gaze direction of said person using at least one of said plurality of video streams;
   projecting said virtual environment onto a plane normal to said gaze direction or onto a plane defined with respect to the head direction of said person for generating a virtual representation corresponding to what that person is looking at and from the point of view of that person;
   displaying said virtual representation on a display;
   said scene comprising one or more screens displaying arbitrary content, wherein said content is captured and forwarded as additional video streams to be used in the step of reconstructing from said plurality of video streams a virtual environment representing the scene as a function of also the 3d pose and physical model of said one or more screens.

2. The method of claim 1, at least one of said cameras being static, said person moving independently from at least one of said cameras.

3. The method of claim 1, comprising a step of extracting background and/or static portions from said plurality of video streams, post-processing said background and/or static portions, reconstructing a virtual environment corresponding to the background portions, and superimposing a virtual foreground corresponding to the foreground that said person is looking at over said virtual environment.

4. The method of claim 1, comprising a step of overlapping or otherwise combining at least two frames of data from one camera, in order to minimise the number of noisy pixels and/or the noise in each frame.

5. The method of claim 1, said plurality of cameras comprising RGB-D cameras delivering RGB video streams with depth information,
   said step of reconstructing a virtual environment comprising retrieving at least one points cloud from at least one video stream, and generating meshes from said points cloud.

6. The method of claim 5, comprising a step of generating from the RGB-D video stream delivered by said RGB-D cameras a mesh in a coordinate system of the corresponding camera, aligning a plurality of meshes associated with respective camera of said plurality of cameras in a common coordinate system, and combining said meshes.

7. The method of claim 1, at least one of said cameras being a front camera of a smartphone of said person, and at least one other camera being a back camera of said smartphone.

8. The method of claim 1, comprising determining the distance of objects the person is looking at and applying blur to objects away from that distance.

9. The method of claim 1, comprising determining the direction the person is looking at and applying blur to a portion of the image away from that direction.

10. The method of claim 1, wherein said one camera is embedded into a mobile device capturing said plurality of video streams of the scene.

11. A computer system comprising: a processor, and program code executed by said processor to implement the method of claim 1.

* * * * *